(12) United States Patent
Hajika et al.

(10) Patent No.: US 10,647,318 B2
(45) Date of Patent: May 12, 2020

(54) LANE DEVIATION PREVENTION CONTROL DEVICE FOR VEHICLE

(71) Applicant: SUBARU CORPORATION, Tokyo (JP)

(72) Inventors: Ryo Hajika, Tokyo (JP); Masahito Takizawa, Tokyo (JP); Yuki Aoyama, Tokyo (JP); Daisuke Mashiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 97 days.

(21) Appl. No.: 16/153,044

(22) Filed: Oct. 5, 2018

(65) Prior Publication Data

US 2019/0152476 A1 May 23, 2019

(30) Foreign Application Priority Data

Nov. 17, 2017 (JP) ................................. 2017-221584

(51) Int. Cl.
| | |
|---|---|
| *B62D 6/00* | (2006.01) |
| *B60W 30/12* | (2020.01) |
| *G08G 1/16* | (2006.01) |
| *B60W 10/20* | (2006.01) |
| *B62D 15/02* | (2006.01) |

(52) U.S. Cl.
CPC ............ *B60W 30/12* (2013.01); *B60W 10/20* (2013.01); *B62D 6/00* (2013.01); *B62D 6/003* (2013.01); *B62D 15/025* (2013.01); *G08G 1/167* (2013.01); *B60W 2520/14* (2013.01)

(58) Field of Classification Search
None
See application file for complete search history.

(56) References Cited

U.S. PATENT DOCUMENTS

| | | | | |
|---|---|---|---|---|
| 2,877,967 A | * | 3/1959 | Markusen | ............ G05D 1/0202 244/185 |
| 4,031,527 A | * | 6/1977 | Yanagishima | ......... B60K 28/06 340/576 |

(Continued)

FOREIGN PATENT DOCUMENTS

| | | | |
|---|---|---|---|
| JP | 63168508 A | * | 7/1988 |
| JP | 2005096710 A | * | 4/2005 |

(Continued)

*Primary Examiner* — Shelley Chen
(74) *Attorney, Agent, or Firm* — McDermott Will & Emery LLP (57) ABSTRACT

A lane deviation prevention control device for a vehicle includes first and second target amount of turn calculators and a target amount of turn switchover determiner. The first target amount of turn calculator calculates a first target amount of turn until an arrival at a first target point. The second target amount of turn calculator calculates a second target amount of turn from the first target point to a second target point. The target amount of turn switchover determiner obtains a yaw angle estimated value until the arrival at the first target point, estimates, on the basis of the yaw angle estimated value, arrival time until the arrival at the first target point, and compares the arrival time with a threshold, to determine timing of a switchover from the first target amount of turn to the second target amount of turn.

5 Claims, 6 Drawing Sheets

(56) References Cited

U.S. PATENT DOCUMENTS

| | | | | |
|---|---|---|---|---|
| 6,496,759 | B1* | 12/2002 | Mattes | B60R 21/013 180/282 |
| 6,577,948 | B1* | 6/2003 | Skellenger | G01C 21/26 303/140 |
| 7,996,131 | B2* | 8/2011 | Yamashita | G01B 21/22 280/735 |
| 2002/0042671 | A1* | 4/2002 | Chen | B60K 28/16 701/41 |
| 2003/0023359 | A1* | 1/2003 | Kueblbeck | B60R 21/013 701/45 |
| 2004/0183663 | A1* | 9/2004 | Shimakage | G06K 9/00798 340/436 |
| 2005/0096828 | A1* | 5/2005 | Uemura | B60T 8/17557 701/70 |
| 2006/0155454 | A1* | 7/2006 | Herrmann | B60T 8/17555 701/70 |
| 2009/0088926 | A1* | 4/2009 | Yamashita | G01B 21/22 701/41 |
| 2011/0238252 | A1* | 9/2011 | Takeda | B60W 40/072 701/31.4 |
| 2012/0212353 | A1* | 8/2012 | Fung | B60W 30/08 340/905 |
| 2013/0063595 | A1* | 3/2013 | Niem | B62D 15/025 348/148 |
| 2015/0246687 | A1* | 9/2015 | Takeda | B62D 6/002 701/41 |
| 2015/0274206 | A1* | 10/2015 | Takeda | B62D 6/008 701/41 |
| 2016/0001781 | A1* | 1/2016 | Fung | G16H 50/20 701/36 |
| 2016/0280262 | A1* | 9/2016 | Oyama | B62D 15/025 |
| 2017/0043772 | A1* | 2/2017 | Watanabe | B60W 30/12 |
| 2017/0113546 | A1* | 4/2017 | Maeda | B60K 23/04 |
| 2018/0057054 | A1* | 3/2018 | Tokoro | G08G 1/167 |
| 2018/0202804 | A1* | 7/2018 | Dumble | G01B 21/24 |

FOREIGN PATENT DOCUMENTS

| | | |
|---|---|---|
| JP | 2016-064799 A | 4/2016 |
| JP | 2017189989 A * | 10/2017 |

* cited by examiner

LANE DEVIATION PREVENTION CONTROL DEVICE FOR VEHICLE

CROSS-REFERENCE TO RELATED APPLICATIONS

The present application claims priority from Japanese Patent Application No. 2017-221584 filed on Nov. 17, 2017, the entire contents of which are hereby incorporated by reference.

BACKGROUND

The technology relates to a lane deviation prevention control device for a vehicle that executes a lane deviation prevention control including preventing the vehicle from deviating from its traveling lane.

Regarding vehicles, e.g., automobiles, there has been known a technique of a lane deviation prevention control. In a case where current behavior of a vehicle is estimated to cause lane deviation, a control instruction is outputted to a steering device such as an electric power steering (EPS) device, to prevent the own vehicle from deviating outwardly from its traveling lane. For example, reference can be made to Japanese Unexamined Patent Application Publication (JP-A) No. 2016-64799.

SUMMARY

An aspect of the technology provides a lane deviation prevention control device for a vehicle. The lane deviation prevention control device includes a first target amount of turn calculator, a second target amount of turn calculator, and a target amount of turn switchover determiner. The first target amount of turn calculator is configured to calculate, on the basis of time it takes for an own vehicle to deviate from a lane on which the own vehicle is traveling, and on the basis of a yaw angle of the own vehicle, a first target amount of turn from a start of a lane deviation prevention control to an arrival at a first target point. The lane deviation prevention control includes preventing the own vehicle from deviating from the lane. The second target amount of turn calculator is configured to calculate, on the basis of time it takes to travel from the first target point to a second target point, and on the basis of the yaw angle of the own vehicle, a second target amount of turn that decides a posture of the own vehicle from the first target point to the second target point. The second target point serves as an end point of the lane deviation prevention control. The target amount of turn switchover determiner is configured to obtain, on the basis of the yaw angle of the own vehicle, a yaw angle estimated value of the own vehicle until the arrival at the first target point, estimates, on the basis of a curvature of the lane and on the basis of the yaw angle estimated value of the own vehicle, arrival time from the start of the lane deviation prevention control to the arrival at the first target point, and compares the estimated arrival time with a threshold, to determine timing of a switchover from the first target amount of turn to the second target amount of turn.

An aspect of the technology provides a lane deviation prevention control device for a vehicle. The lane deviation prevention control device includes circuitry. The circuitry is configured to calculate, on the basis of time it takes for an own vehicle to deviate from a lane on which the own vehicle is traveling, and on the basis of a yaw angle of the own vehicle, a first target amount of turn from a start of a lane deviation prevention control to an arrival at a first target point. The lane deviation prevention control includes preventing the own vehicle from deviating from the lane. The circuitry is configured to calculate, on the basis of time it takes to travel from the first target point to a second target point, and on the basis of the yaw angle of the own vehicle, a second target amount of turn that decides a posture of the own vehicle from the first target point to the second target point. The second target point serves as an end point of the lane deviation prevention control. The circuitry is configured to obtain, on the basis of the yaw angle of the own vehicle, a yaw angle estimated value of the own vehicle until the arrival at the first target point, estimates, on the basis of a curvature of the lane and on the basis of the yaw angle estimated value of the own vehicle, arrival time from the start of the lane deviation prevention control to the arrival at the first target point, and compares the estimated arrival time with a threshold, to determine timing of a switchover from the first target amount of turn to the second target amount of turn.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same numerals to avoid redundant description.

In general, a lane deviation prevention control assumes a first target point and a second target point. The first target point is a location where a relative-to-lane yaw angle of an own vehicle becomes zero (0) with respect to a lane line on deviation side, i.e., on side on which deviation is taking place. The second target point is a location of an end of the control after passing the first target point. The lane deviation prevention control is achieved by two controls, i.e., a control by an initial target amount of turn that prevents lane deviation before passing the first target point, and a control by a target amount of turn that controls a posture of the own vehicle from the first target point to the second target point.

Timing of a switchover between the two controls is determined on the basis of whether or not the own vehicle is directed toward a direction of return to inside the lane, continuously for predetermined time, with respect to the lane line on the deviation side. A condition of the end of the control as to the lane deviation prevention control is that the own vehicle has successfully returned to inside the lane by a predetermined distance from the lane line on the deviation side.

At the end of the control as to the lane deviation prevention control, in consideration of deviation toward an opposite lane to a direction in which deviation prevention has been executed, it is desirable to end the control, with the own vehicle taking the posture with a relatively small yaw angle with respect to the opposite lane.

Actually, however, there is delay in a vehicle response, or delay in detection of lane information, in response to a control instruction. This causes the situation that a larger yaw angle than a target yaw angle has been already generated when vehicle action reflects a control instruction given immediately after a switchover between the target amounts of turn. Therefore, at the end of the lane deviation prevention control, the own vehicle takes the posture with the larger yaw angle than the target yaw angle, from which arises concern of behavior in a deviation-inducing direction toward the opposite lane to the direction in which the deviation prevention has been executed.

It is desirable to provide a lane deviation prevention control device for a vehicle that makes it possible to determine timing of a switchover between target amounts of turn in a lane deviation prevention control, in consideration of delay in a vehicle response or delay in detection of lane information, leading to optimization of a vehicle posture at an end of the control.

Figure 1:
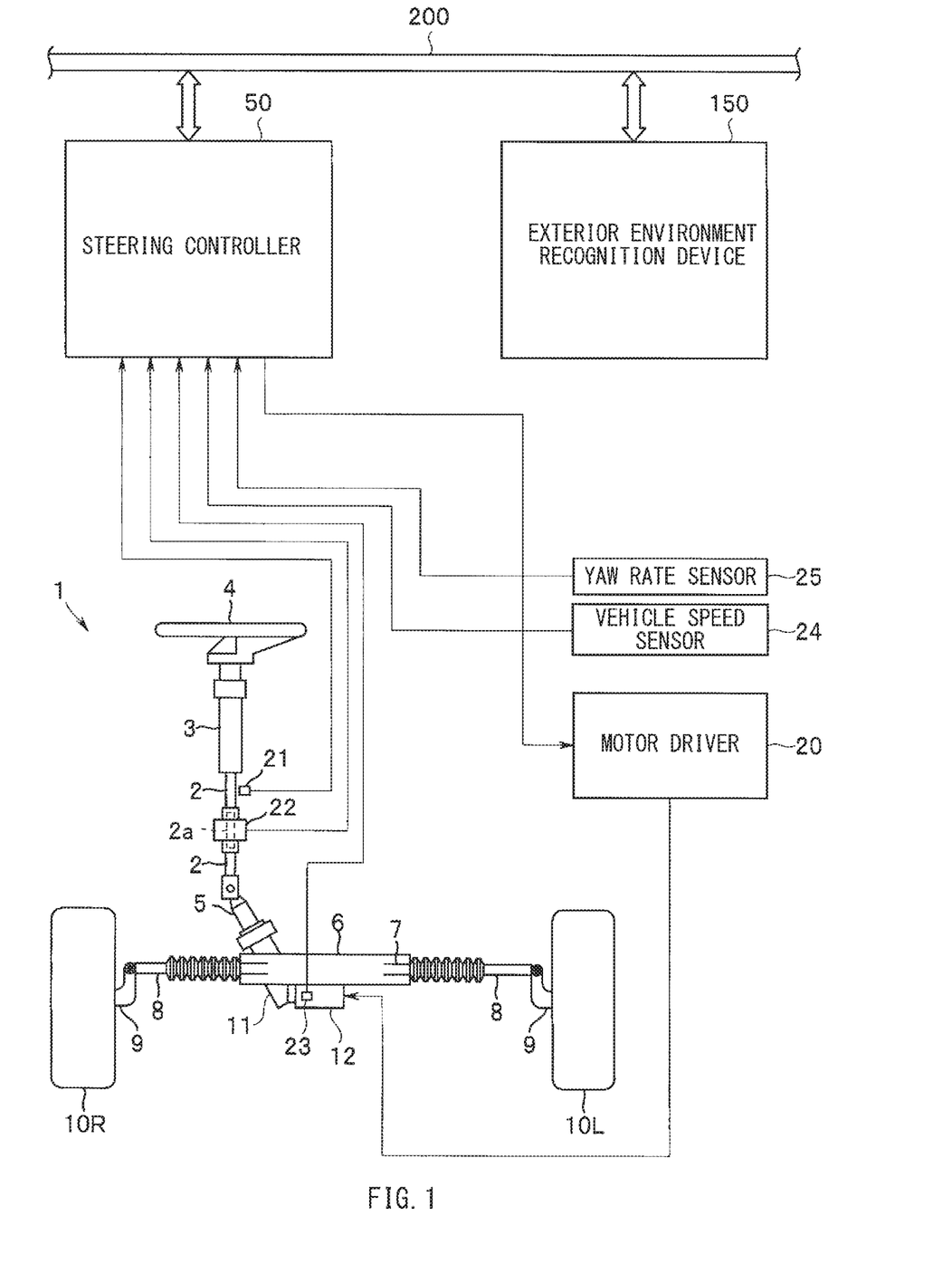
FIG. 1 is a diagram illustrating an example of a configuration of a vehicle steering system.

FIG. 1 illustrates an electronic power steering (EPS) device 1. The EPS device 1 may serve as a steering device that is able to control a steering angle through an actuator, independently of a steering input by a driver. In the EPS device 1, a steering shaft 2 may be rotatably supported, through a steering column 3, by an undepicted chassis of a vehicle, e.g., an automobile.

One end of the steering shaft 2 may be extended toward a driver's seat, while another end of the steering shaft 2 may be extended toward an engine room. A steering wheel 4 may be fixed to the end of the steering shaft 2 on side on which the driver's seat is disposed. A steering angle sensor 21 may be disposed on outer circumferential side of the steering shaft 2 to which the steering wheel 4 is coupled.

The steering angle sensor 21 may include, for example, two pairs of magnetoresistive elements, in its inside. The magnetoresistive elements may detect rotation of a magnet incorporated in a sensing gear. The steering angle sensor 21 may set in advance a reference rotation position of the steering wheel 4. The reference rotation position may be, for example, a rotation position of an upper part of the steering wheel 4 in a straight traveling state of the vehicle. Thus, the steering angle sensor 21 may be able to detect, on the basis of a variation in magnetism caused by rotation of the sensing gear, a rotation angle, i.e., a steering angle, and a rotation direction, i.e., a steering direction, from the fixed reference position set in advance.

A torsion bar 2a may be disposed in the middle of the steering shaft 2. A pinion shaft 5 may be coupled to the end of the steering shaft 2 extended toward the engine room. A torque sensor 22 may be disposed on outer circumferential side of the torsion bar 2a. The torque sensor 22 may detect dislocation caused by torsion of the torsion bar 2a. The dislocation is generated circumferentially around the steering shaft 2, between side on which the steering wheel 4 is disposed and side on which the pinion shaft 5 is disposed. Thus, the torque sensor 22 may be able to detect steering torque produced by steering by the driver.

A steering gear box 6 may be disposed inside the engine room. The steering gear box 6 may extend in a vehicle widthwise direction. A rack shaft 7 may be reciprocatably inserted in and supported by the steering gear box 6. The rack shaft 7 may include undepicted racks. The racks may be engaged with pinions formed on the pinion shaft 5, to form a rack-and-pinion steering mechanism.

Right and left ends of the rack shaft 7 may each be protruded from respective ends of the steering gear box 6. To the protruded ends of the rack shaft 7, coupled may be front knuckles 9, through tie rods 8. The front knuckles 9 may rotatably support right and left wheels 10R and 10L as steering wheels. The front knuckles 9 may be steerably supported by the chassis. Operating the steering wheel 4 causes rotation of the steering shaft 2 and the pinion shaft 5. The rotation of the pinion shaft 5 causes rightward or leftward movement of the rack shaft 7. The movement causes the front knuckles 9 to rotate around an undepicted king pin shaft as a center, causing the right and left wheels 10R and 10L to be steered rightward or leftward.

An electric power steering (EPS) motor 12 may be coupled to the pinion shaft 5 through an assistant transmission mechanism 11. The EPS motor 12 may serve as an actuator that allows for assistance with the driver's steering operation and automatic steering. The assistant transmission mechanism 11 may include a reduction gear mechanism such as worm gears. The EPS motor 12 may be, for example, an electric motor constituted by a direct current (DC) brushless motor including a stator and a rotor. The stator may be fixed to a case. The rotor may rotate inside the stator. The rotation of the rotor of the electric motor is converted, through the assistant transmission mechanism 11, into axial movement of the rack shaft 7.

A rotation angle sensor 23 may be incorporated in the EPS motor 12. The rotation angle sensor 23 may detect a rotation angle of the rotor. The rotation angle sensor 23 may be, for example, a sensor that detects a relative rotation angle of the rotor to a predetermined zero point position by, for example, a rotary encoder. A signal from the rotation angle sensor 23 may be supplied to the steering controller 50.

It is to be noted that in the rotation angle sensor 23, initial setting of the zero point position may be provided, for example, when an ignition switch is turned to an 'ON' position. The initial setting may be based on the steering angle detected by the steering angle sensor 21 and based on a reduction ratio of the assistant transmission mechanism 11. Normally, the rotation angle detected by the rotation angle sensor 23 and the rotation angle of the steering wheel 4 detected by the steering angle sensor 21 may be dealt as the same steering angle.

The steering controller 50 may be a control unit that includes a microcomputer as its main component. The microcomputer may include, for example, a central processing unit (CPU), a read only memory (ROM) that stores, for example, programs, and a random access memory (RAM) that serves as a work area. The steering controller 50 may perform a drive control of the EPS motor 12 through the motor driver 20. The steering controller 50 may be supplied with signals from sensors and undepicted switches. Non-limiting examples of the sensors may include the steering angle sensor 21, the torque sensor 22, the rotation angle sensor 23, and other sensors including a vehicle speed sensor 24 and a yaw rate sensor 25. The vehicle speed sensor 24 may detect a vehicle speed. The yaw rate sensor 25 may detect a yaw rate, i.e., a rotation speed of the vehicle around a vertical axis.

The steering controller 50 may be coupled to a communication bus 200 that forms an in-vehicle network. To the communication bus 200, coupled may be an exterior environment recognition device 150 that recognizes exterior environment of the vehicle, to acquire travel environment information. Other undepicted controllers may be also coupled to the communication bus 200. Non-limiting examples may include an engine controller, a transmission controller, and a brake controller. The controllers are able to transmit and receive control information to and from one another through the communication bus 200.

The exterior environment recognition device 150 may recognize the exterior environment around the own vehicle on the basis of, for example, detection information of objects around the own vehicle, traffic information, positioning information of a position of the own vehicle, and high definition map information. The detection information may be acquired by various devices such as a camera and millimeter wave radar for forward recognition, and a side camera and sideward radar for sideward recognition. The traffic information may be acquired by infrastructure communication such as road-vehicle communication and inter-vehicle communication. The positioning information may be based on signals from, for example, global positioning satellites (GPS). The high definition map information may include road shape data and data for a travel control. Non-limiting examples of the road shape data may include a curvature, a lane width, and a road shoulder width of a road. Non-limiting examples of the data for the travel control may include a road azimuth angle, categories of lane lines, and the number of lanes.

In one implementation, the exterior environment recognition device 150 may mainly perform recognition of forward environment of the own vehicle. The recognition of the forward environment may be made by an on-vehicle camera and an image recognition unit. As the camera for forward recognition, used may be a stereo camera including two cameras that capture images of an identical object from different points of view. The two cameras that constitute the stereo camera may be a shutter synchronous camera including imaging elements such as charge coupled device (CCD) and complementary metal oxide semiconductor (CMOS). The two cameras may be disposed, for example, in the vicinity of a rearview mirror inside a front windshield in an upper part of a vehicle cabin, with a predetermined baseline length.

Processing on image data from the stereo camera may be carried out, for example, as follows. First, a distance image may be generated, on the basis of an amount of dislocation between corresponding positions, in a pair of stereo images in the traveling direction of the own vehicle captured by the stereo camera. The distance image may have distance information. With the use of the distance information of the distance image, recognition of lane lines and recognition processing of three-dimensional objects may be carried out. Non-limiting examples of the lane lines may include white lane lines and other kinds of lane lines. Non-limiting examples of the three-dimensional objects may include preceding vehicles and oncoming vehicles.

In the recognition of the lane lines such as the white lane lines, changes in luminance of a road in a widthwise direction may be evaluated on the basis of knowledge that the lane lines are higher in luminance than a road surface.

Thus, positions of right and left lane lines on an image plane may be identified on the image plane. A position (x, y, z) of the lane line in actual space may be calculated by a known coordinate conversion expression, on the basis of the distance information, i.e., on the basis of a position (i, j) on the image plane and parallax calculated regarding the relevant position (i, j).

A coordinate system in the actual space may be set, with reference to the position of the own vehicle. In this implementation, as illustrated in, for example, FIG. 3, the coordinate system in the actual space may have the road surface directly below the camera as an origin, a vehicle widthwise direction as an x axis, a vehicle heightwise direction as a y axis, and a vehicle lengthwise direction, i.e., a direction of distance, as a z axis. At this occasion, an x-z plane (y=0) may coincide with the road surface, in a case where the road is flat. A road model may be represented, by dividing the traveling lane of the own vehicle on the road into a plurality of sections, approximating right and left lane lines in each section as predetermined, and coupling the approximated right and left lane lines to one another.

For the approximation processing of the right and left lane lines, adopted may be, for example, approximation processing of the lane lines by a least square method. In one specific but non-limiting example, the lane line on left side of the own vehicle may be approximated by the least square method, as given by the following expression (1). The lane line on right side of the own vehicle may be approximated by the least square method, as given by the following expression (2).

$$x = AL \cdot z^2 + BL \cdot z + CL \tag{1}$$

$$x = AR \cdot z^2 + BR \cdot z + CR \tag{2}$$

In the expressions (1) and (2) given above, "AL" and "AR" denote curvatures of respective curves. A curvature κL of the lane line on the left side may be 2·AL. A curvature κR of the lane line on the right side may be 2·AR. Thus, a lane curvature κ may be represented by the following expression (3).

$$\kappa = (2 \cdot AL + 2 \cdot AR)/2 = AL + AR \tag{3}$$

Figure 3:
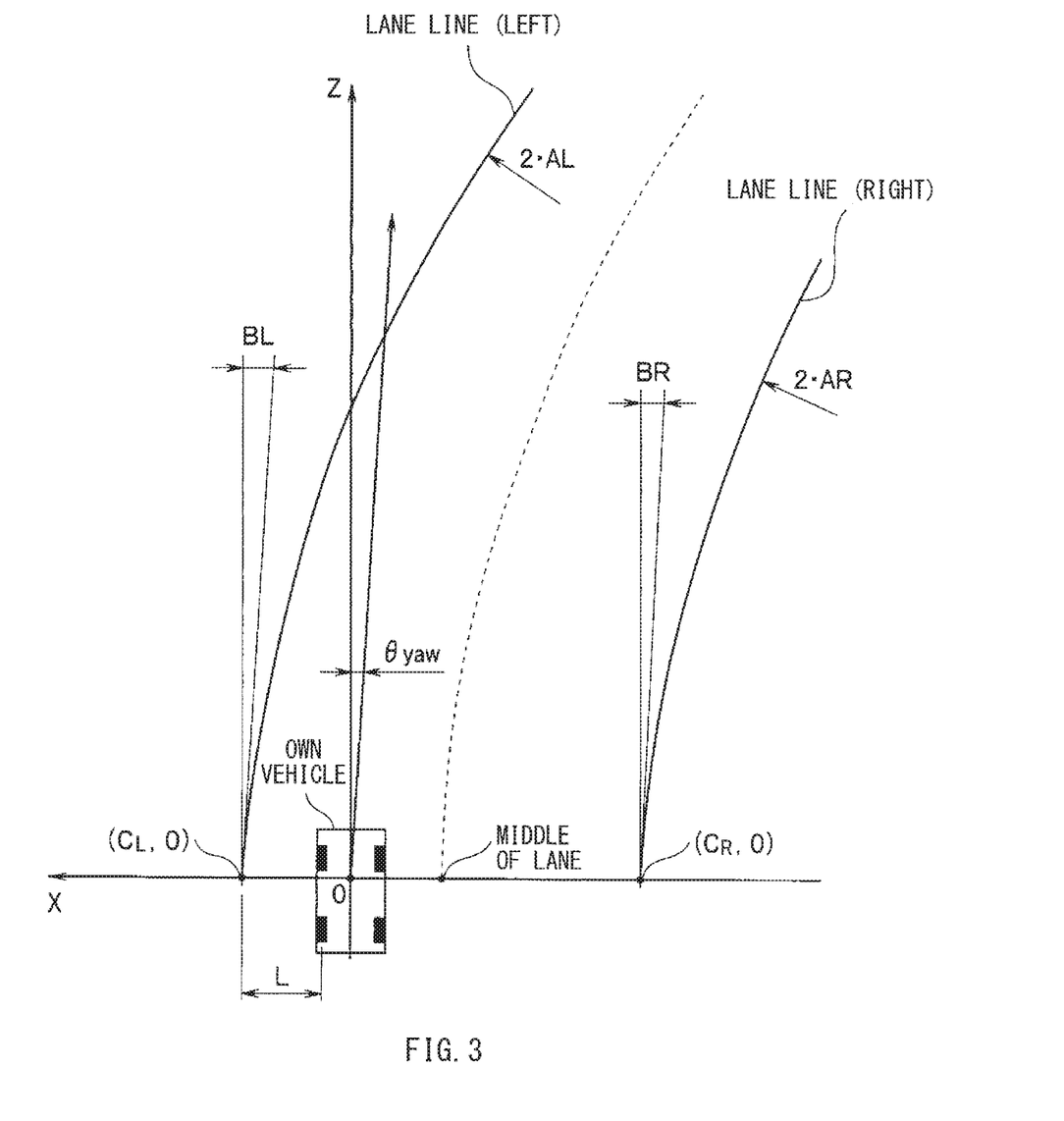
FIG. 3 is a diagram describing an own vehicle and a lane, together with various parameters.

In the expressions (1) and (2), "BL" and "BR" denote inclinations of the respective curves in the widthwise direction of the own vehicle. "CL" and "CR" denote positions of the respective curves in the widthwise direction of the own vehicle. Refer to FIG. 3.

The exterior environment recognition device 150 may further calculate a relative-to-lane yaw angle θyaw of the own vehicle, by the following expression (4).

$$\theta yaw = \tan^{-1}((BL+BR)/2) \tag{4}$$

A recognition result of the exterior environment by the exterior environment recognition device 150 may be transmitted to the steering controller 50 and other controllers. The steering controller 50 may perform a driver assistance control that includes automatic driving of the own vehicle and assisting the driver with driving. In the driver assistance control, the steering controller 50 may set a target course to be traveled by the own vehicle, from the recognition result of the exterior environment. The steering controller 50 may execute a steering assistance control, through the motor driver 20 that drives the EPS motor 12, to allow the own vehicle to travel to follow the target course. In a case with detection of steering interference by an operation of the steering wheel by the driver, the steering controller 50 may allow the EPS motor 12 to output assistive torque that assists the driver with a steering operation.

The target course in a steering control by the steering controller 50 may be set on the basis of the recognition result of the exterior environment by the exterior environment recognition device 150. For example, in a lane keeping control that includes allowing the own vehicle to follow a lane and keeping the own vehicle in the middle of the lane, the middle position between the right and left lane lines in a road widthwise direction may be set as the target course. The steering controller 50 may set a target steering angle that allows a middle position of the own vehicle in the vehicle widthwise direction to coincide with the target course. The steering controller 50 may control a drive current of the EPS motor 12, to allow the steering angle of the steering control to coincide with the target steering angle. It is to be noted that the target course may be set by other controllers than the steering controller 50, e.g., the exterior environment recognition device 150.

The steering controller 50 may execute not only the lane keeping control but also a lane deviation prevention control. The lane keeping control may include keeping the own vehicle in the middle of the lane. The lane deviation prevention control may include preventing the own vehicle from deviating from the lane. In one specific but non-limiting example, the steering controller 50 may calculate lane deviation estimated time Ttlc, in a case where the relative-to-lane yaw angle of the own vehicle is directed toward a direction of deviation, on the basis of information from the exterior environment recognition device 150 and on the basis of driving states of the own vehicle. The lane deviation estimated time Ttlc refers to time it takes for the own vehicle to stride over the lane line on the deviation side. In a case where the lane deviation estimated time Ttlc is equal to or smaller than a threshold Tth, the steering controller 50 may start the lane deviation prevention control. The threshold Tth may be decided by the vehicle speed V of the own vehicle and the lane curvature κ.

The lane deviation estimated time Ttlc may be obtained by dividing a distance L from the own vehicle to the lane line on the deviation side by a speed component of the vehicle speed V of the own vehicle corresponding to the relative-to-lane yaw angle θyaw, as represented by the following expression (5).

$$Ttlc = L/(V \cdot \sin \theta yaw) \quad (5)$$

Figure 4:
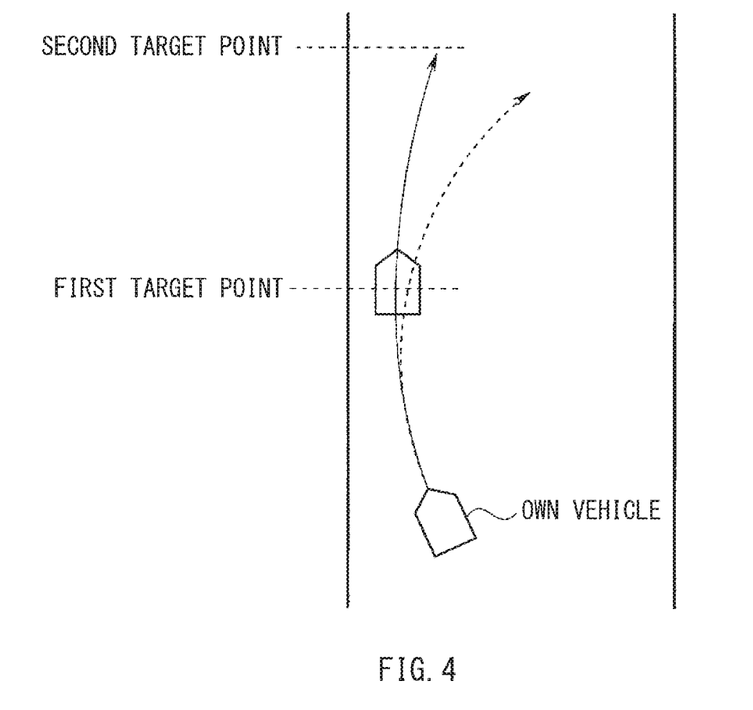
FIG. 4 is a diagram illustrating target points of a lane deviation prevention control.

In the lane deviation prevention control, as illustrated in FIG. 4, a location where the own vehicle takes a posture parallel to the lane line on the deviation side is assumed to be a first target point. At the beginning, until an arrival at the first target point, the lane deviation prevention control may include controlling behavior that allows the own vehicle to return to inside the lane. After the arrival at the first target point, the lane deviation prevention control may include controlling the posture of the own vehicle, toward a second target point as the end of the control. In this implementation, the control from the start of the lane deviation prevention control to the arrival at the first target point is referred to as a return-to-inside-lane control, i.e., a control for a return to inside the lane. The control from the first target point to the second target point is referred to as a posture control that controls the posture after the return to inside the lane to the end of the control.

Figure 2:
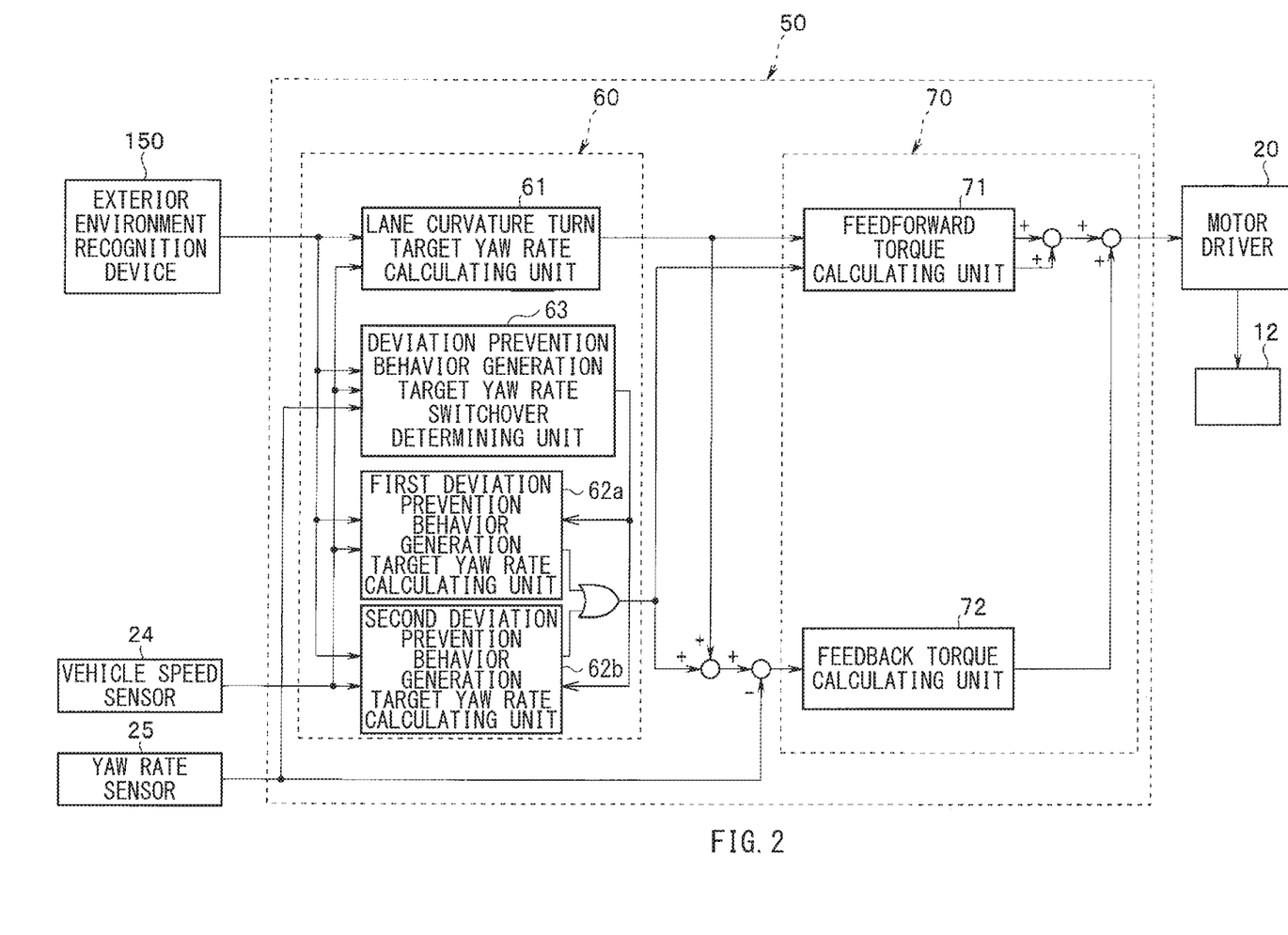
FIG. 2 is a block diagram illustrating an example of functions of a steering control system.

Thus, as illustrated in FIG. 2, the steering controller 50 may include, as its main configuration, a target yaw rate amount calculating unit 60 and a target steering torque calculating unit 70. The target yaw rate amount calculating unit 60 may calculate a target yaw rate. The target yaw rate may serve as a target amount of turn that allows the own vehicle to travel along the target course. The target steering torque calculating unit 70 may calculate target steering torque that serves as instruction torque for the EPS motor 12 in order to attain the target yaw rate. The steering controller 50 may allow the target yaw rate amount calculating unit 60 to have a function of determining which is being carried out, the return-to-inside-lane control or the posture control, to make a switchover between the target amounts of turn. The target yaw rate amount calculating unit 60 and the target steering torque calculating unit 70 may serve as functional units related to the lane deviation prevention control.

In one specific but non-limiting example, the target yaw rate amount calculating unit 60 may include a lane curvature turn target yaw rate calculating unit 61, a first deviation prevention behavior generation target yaw rate calculating unit 62a, a second deviation prevention behavior generation target yaw rate calculating unit 62b, and a deviation prevention behavior generation target yaw rate switchover determining unit 63. The lane curvature turn target yaw rate calculating unit 61 may calculate a lane curvature turn target yaw rate γtgt_lane that serves as a target amount of turn in accordance with the lane curvature. The first deviation prevention behavior generation target yaw rate calculating unit 62a may calculate a first deviation prevention behavior generation target yaw rate γtgt_turn_1 in the return-to-inside-lane control at the start of the lane deviation prevention control. The second deviation prevention behavior generation target yaw rate calculating unit 62b may calculate a second deviation prevention behavior generation target yaw rate γtgt_turn_2 in the posture control after the return-to-inside-lane control. The deviation prevention behavior generation target yaw rate switchover determining unit 63 may determine timing of a switchover from the return-to-inside-lane control to the posture control, to give an instruction to make a switchover from the first deviation prevention behavior generation target yaw rate γtgt_turn_1 to the second deviation prevention behavior generation target yaw rate γtgt_turn_2.

In one implementation, the first deviation prevention behavior generation target yaw rate calculating unit 62a may serve as a "first target amount of turn calculator". In one implementation, the first deviation prevention behavior generation target yaw rate γtgt_turn_1 may serve as a "first target amount of turn". In one implementation, the second deviation prevention behavior generation target yaw rate calculating unit 62b may serve as a "second target amount of turn calculator". In one implementation, the second deviation prevention behavior generation target yaw rate γtgt_turn_2 may serve as a "second target amount of turn". In one implementation, the deviation prevention behavior generation target yaw rate switchover determining unit 63 may serve as a "target amount of turn switchover determiner".

The lane curvature turn target yaw rate calculating unit 61 may calculate the lane curvature turn target yaw rate γtgt_lane, with the vehicle speed V of the own vehicle and the lane curvature κ, as represented by the following expression (6).

$$\gamma tgt\_lane = \kappa \cdot V \quad (6)$$

The first deviation prevention behavior generation target yaw rate calculating unit 62a may calculate the first deviation prevention behavior generation target yaw rate γtgt_turn_1, in accordance with the relative-to-lane yaw angle θyaw and a lateral position of the own vehicle. The first deviation prevention behavior generation target yaw rate γtgt_turn_1 may generate behavior that causes the return to inside the lane in the return-to-inside-lane control at the start of the lane deviation prevention control. The first deviation prevention behavior generation target yaw rate γtgt_turn_1 may be calculated on the basis of the relative-to-lane yaw angle θyaw of the own vehicle and the lane deviation estimated time Ttlc, as represented by the following expression (7).

$$\gamma tgt\_turn\_1 = \theta yaw / Ttlc \quad (7)$$

It is to be noted that as to the yaw rate and the curvature, a positive sign is assumed to represent a left turn. As to the relative-to-lane yaw angle, a positive sign is assumed to represent the direction of deviation. As to the lateral position, a positive sign is assumed to represent inside the lane.

The second deviation prevention behavior generation target yaw rate calculating unit 62b may calculate the second deviation prevention behavior generation target yaw rate γtgt_turn_2 during the posture control. The second deviation prevention behavior generation target yaw rate γtgt_turn_2 may be calculated by dividing, by target time Tend, a value obtained by multiplying, by a predetermined feedback gain Kyawfb, a deviation between a target relative-to-lane yaw angle bend at the end of the control and the relative-to-lane yaw angle θyaw during the posture control, as represented by the following expression (8). The target time Tend is time it takes to arrive at a location of the end of the posture control, i.e., the second target point.

$$\gamma tgt\_turn\_2 = -Kyawfb \cdot (\theta end - \theta yaw)/Tend \quad (8)$$

The first deviation prevention behavior generation target yaw rate γtgt_turn_1 by the first deviation prevention behavior generation target yaw rate calculating unit 62a and the second deviation prevention behavior generation target yaw rate γtgt_turn_2 by the second deviation prevention behavior generation target yaw rate calculating unit 62b may be selectively switched at timing determined by the deviation prevention behavior generation target yaw rate switchover determining unit 63. Thus, either one of them may be outputted to the target steering torque calculating unit 70 as the deviation prevention behavior generation target yaw rate γtgt_turn.

The deviation prevention behavior generation target yaw rate switchover determining unit 63 may calculate first target point arrival time Ttgt, i.e., estimated time it takes for the own vehicle to arrive at the first target point. The deviation prevention behavior generation target yaw rate switchover determining unit 63 may determine, on the basis of the first target point arrival time Ttgt, the timing of the switchover from the first deviation prevention behavior generation target yaw rate γtgt_turn_1 to the second deviation prevention behavior generation target yaw rate γtgt_turn_2.

Time T it takes to arrive at the first target point may be obtained by dividing a difference between a relative-to-lane yaw angle θtgt at the first target point and a relative-to-lane yaw angle estimated value θ until the arrival at the first target point, by a difference between a yaw rate γ of the own vehicle and the yaw rate κ·V in accordance with the lane curvature, as represented by the following expression (9). For the yaw rate κ·V, refer to the forgoing expression (6).

$$T = (\theta tgt - \theta)/(\gamma - \kappa \cdot V) \quad (9)$$

The relative-to-lane yaw angle θtgt at the first target point is zero (0). Accordingly, the first target point arrival time Ttgt may be calculated by the following expression (10) in which zero is substituted for θtgt in the expression (9) (θtgt=0).

$$Ttgt = -\theta/(\gamma \cdot \kappa \cdot V) \quad (10)$$

The relative-to-lane yaw angle estimated value θ until the arrival at the first target point may be represented by the following expression (11).

$$\theta = \theta yaw + \int (\gamma \cdot \kappa \cdot V) dt \quad (11)$$

In the expression (11), the relative-to-lane yaw angle θyaw recognized from the camera images may be corrected by a value obtained by integration of the difference between the yaw rate γ of the own vehicle and the yaw rate κ·V in accordance with the lane curvature for predetermined time. In this way, as denoted by a broken line in FIG. 4, it is possible to prevent the yaw angle at the end of the control from inappropriately increasing because of deviation between actual vehicle behavior and a control instruction value.

In other words, the relative-to-lane yaw angle estimated value θ may be obtained, depending on integration time of the difference between the yaw rate γ of the own vehicle and the yaw rate κ·V in accordance with the lane curvature, by correcting the relative-to-lane yaw angle θyaw detected from the camera images in accordance with output delay time of the yaw angle, or alternatively, by correcting the relative-to-lane yaw angle θyaw in accordance with yaw response time of the vehicle. In another alternative, the relative-to-lane yaw angle estimated value θ may be obtained by correcting the relative-to-lane yaw angle θyaw in accordance with total time of the output delay time of the yaw angle and the yaw response time of the vehicle.

Thus, it is possible to give the instruction to make the switchover from the return-to-inside-lane control to the posture control, before the own vehicle arrives at the first target point, in advance at timing in consideration of the output delay of the yaw angle or the delay of a yaw response of the vehicle. This makes it possible to start the posture control at time when the own vehicle actually arrives at the first target point. As a result, it is possible to take sufficient time to perform the posture control, allowing for the end of the lane deviation prevention control with an appropriate vehicle posture, i.e., an appropriate yaw angle.

In one specific but non-limiting example, the deviation prevention behavior generation target yaw rate switchover determining unit 63 may determine that it is the timing to make the switchover from the return-to-inside-lane control to the posture control, in a case where the first target point arrival time Ttgt is equal to or smaller than a preset threshold Tset, and where the first target point arrival time Ttgt is kept equal to or smaller than the threshold (Ttgt≤Tset) for predetermined time or longer. Thus, the deviation prevention behavior generation target yaw rate switchover determining unit 63 may instruct the first deviation prevention behavior generation target yaw rate calculating unit 62a and the second deviation prevention behavior generation target yaw rate calculating unit 62b to make the switchover of the deviation prevention behavior generation target yaw rate γtgt_turn to be outputted to the target steering torque calculating unit 70, from the first deviation prevention behavior generation target yaw rate γtgt_turn_1 to the second deviation prevention behavior generation target yaw rate γtgt_turn_2.

The deviation prevention behavior generation target yaw rate γtgt_turn, i.e., γtgt_turn_1 or γtgt_turn_2, and the lane curvature turn target yaw rate γtgt_lane as mentioned above may be added together to calculate a final target yaw rate γtgt, as represented by the following expression (12).

$$\gamma tgt = \gamma tgt\_lane + \gamma tgt\_turn \quad (12)$$

The target steering torque calculating unit 70 may include a feedforward torque calculating unit 71 and a feedback torque calculating unit 72. The feedforward torque calculating unit 71 may calculate feedforward torque by a feedforward control. The feedback torque calculating unit 72 may calculate feedback torque by a feedback control. The target steering torque calculating unit 70 may output, as the instruction torque for the EPS motor 12, the target torque that is obtained by adding the feedforward torque and the feedback torque.

The feedforward torque calculating unit 71 may calculate feedforward torque $Tp\_ff\_lane$ that generates the lane curvature turn target yaw rate $\gamma tgt\_lane$. The feedforward torque calculating unit 71 may also calculate feedforward torque $Tp\_ff\_turn$ that generates the deviation prevention behavior generation target yaw rate $\gamma tgt\_turn$.

The feedforward torque $Tp\_ff\_lane$ and $Tp\_ff\_turn$ may be calculated with the use of a torque conversion gain $Kyawr\_to\_trq$. The torque conversion gain $Kyawr\_to\_trq$ may be obtained by referring to a map of the yaw rate and the torque conversion gain. The map may be created in advance. In other words, as represented by the following expression (13), the feedforward torque $Tp\_ff\_lane$ may be calculated by multiplying the lane curvature turn target yaw rate $\gamma tgt\_lane$ by the torque conversion gain $Kyawr\_to\_trq$. As represented by the following expression (14), the feedforward torque $Tp\_ff\_turn$ may be calculated by multiplying the deviation prevention behavior generation target yaw rate $\gamma tgt\_turn$ by the torque conversion gain $Kyawr\_to\_trq$.

$$Tp\_ff\_lane = Kyawr\_to\_trq \cdot \gamma tgt\_lane \quad (13)$$

$$Tp\_ff\_turn = Kyawr\_to\_trq \cdot \gamma tgt\_turn \quad (14)$$

The feedback torque calculating unit 72 may calculate feedback torque $Tp\_fb$ based on a deviation between the final target yaw rate $\gamma tgt$ and the actual yaw rate $\gamma$ of the own vehicle detected by the yaw rate sensor 25. In one specific but non-limiting example, the feedback torque $Tp\_fb$ may be obtained by proportional integral differential (PID) control on the deviation $(\gamma tgt-\gamma)$ between the target yaw rate $\gamma tgt$ and the actual yaw rate $\gamma$, as represented by the following expression (15).

$$Tp\_fb = Kp \cdot (\gamma tgt - \gamma) + Ki \cdot \int(\gamma tgt - \gamma)dt + Kd \cdot d(\gamma tgt - \gamma)/dt \quad (15)$$

A proportional gain $Kp$, an integral gain $Ki$, and a differential gain $Kd$ of the PID control in the expression (15) may be set in accordance with presence or absence of the driver's operation of the steering wheel. In a case without the driver's operation of the steering wheel, i.e., in a case where the torque sensor 22 does not detect the steering torque, the proportional gain $Kp$, the integral gain $Ki$, and the differential gain $Kd$ may be set in accordance with characteristics optimally set in advance. Meanwhile, in a case where the torque sensor 22 detects the driver's steering operation in a direction in which the deviation is suppressed, the proportional gain $Kp$, the integral gain $Ki$, and the differential gain $Kd$ may be brought to zero (0). Thus, the feedback torque $Tp\_fb$ may be brought to zero (0), as represented by the following expression (16).

$$Tp\_fb = 0 \quad (16)$$

The feedforward torque $Tp\_ff\_lane$ and $Tp\_ff\_turn$ from the feedforward torque calculating unit 71, and the feedback torque $Tp\_fb$ from the feedback torque calculating unit 72 may be added together, as represented by the following expression (17), to calculate the target steering torque $Tp$. The target steering torque $Tp$ may be outputted as the instruction torque for the EPS motor 12.

$$Tp = Tp\_ff\_lane + Tp\_ff\_turn + Tp\_fb \quad (17)$$

Figure 5:
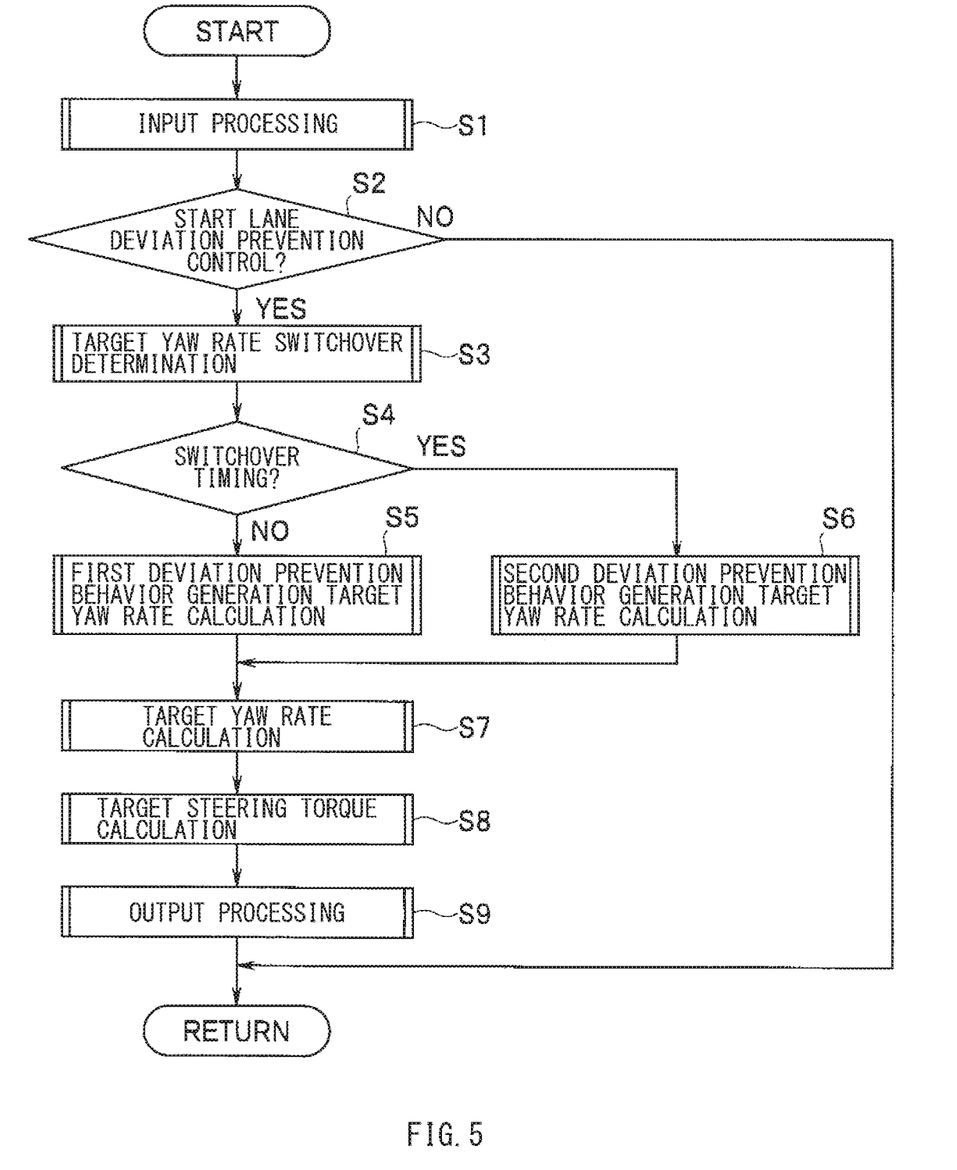
FIG. 5 is a flowchart illustrating an example of a main routine of the lane deviation prevention control.
Figure 6:
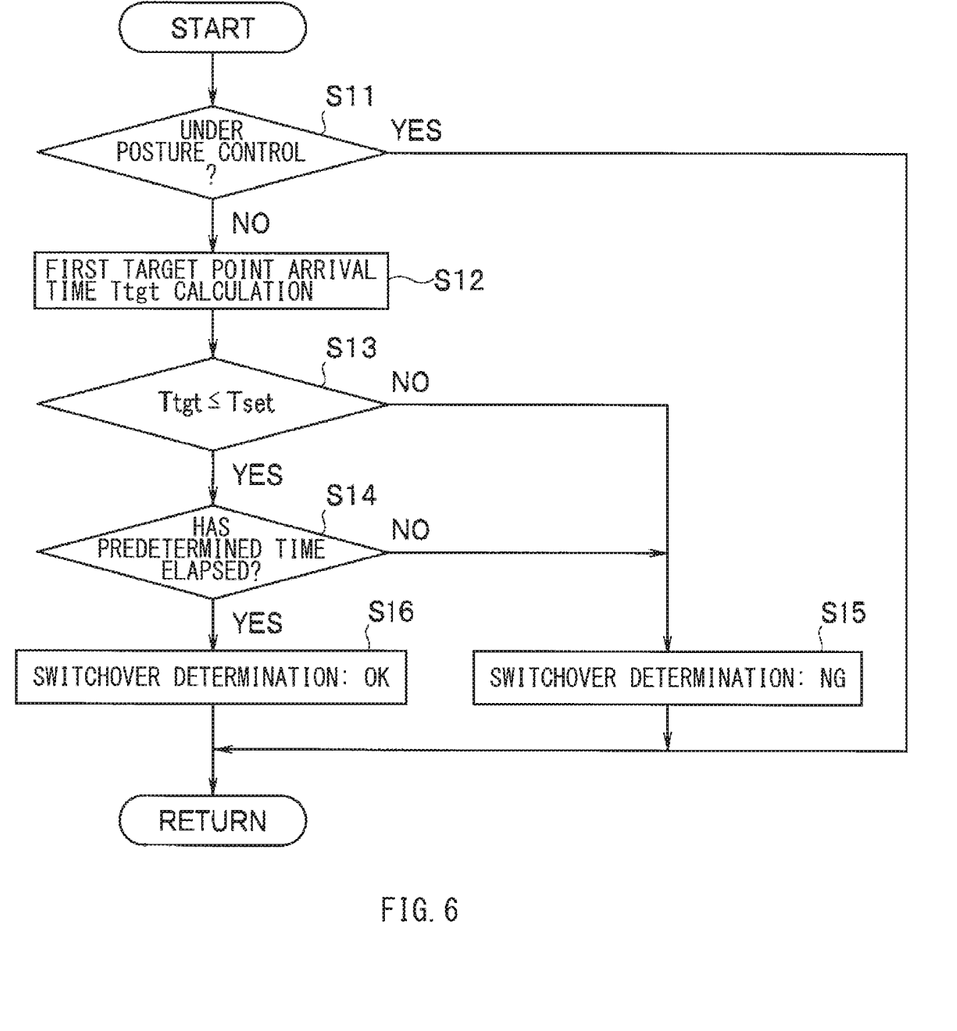
FIG. 6 is a flowchart illustrating an example of a routine of a determination as to whether to make a switchover of a deviation prevention behavior generation target yaw rate.

Description now moves on to program processing related to the lane deviation prevention control as described above, with reference to flowcharts of FIGS. 5 and 6. The lane deviation prevention control is to be executed by the steering controller 50. The flowchart of FIG. 5 illustrates an example of a main routine of the lane deviation prevention control. The flowchart of FIG. 6 illustrates an example of a deviation prevention behavior generation target yaw rate switchover determination routine, in the main routine. The deviation prevention behavior generation target yaw rate switchover determination routine includes determining the timing of the switchover of the deviation prevention behavior generation target yaw rate.

First, referring to FIG. 5, described is the main routine of the lane deviation prevention control. In the main routine, first, in step S1, the steering controller 50 may perform input processing. The input processing includes inputting, for example, sensor signals, recognition information, and control information. For example, the steering controller 50 may input signals from the sensors and undepicted switches, the recognition information by the camera from the exterior environment recognition device 150, and the control information from other controllers through the communication bus 200. Non-limiting examples of the sensors may include the steering angle sensor 21, the torque sensor 22, the rotation angle sensor 23, the vehicle speed sensor 24, and the yaw rate sensor 25.

Thereafter, the routine may proceed to step S2. In step S2, a determination may be made as to whether or not to start the lane deviation prevention control. For example, in a case where the following condition is satisfied, a determination may be made that the lane deviation prevention control is to be started, and the routine may proceed from step S2 to step S3. Non-limiting examples of the condition is that the current relative-to-lane yaw angle $\theta yaw$ of the own vehicle satisfies $\theta yaw \geq 0$, i.e., that the current relative-to-lane yaw angle $\theta yaw$ is directed toward the direction of deviation, and that the lane deviation estimated time $Ttlc$ is equal to or smaller than the threshold $Tth$. The lane deviation estimated time $Ttlc$ is the time it takes for the own vehicle to deviate from the lane. The threshold $Tth$ may be decided by the vehicle speed V and the lane curvature $\kappa$. In a case where the forgoing condition is not satisfied, a determination may be made that the lane deviation prevention control is not to be started, and the routine may be terminated.

In step S3, the deviation prevention behavior generation target yaw rate switchover determination routine in FIG. 6 may be executed, to determine the timing of the switchover of the deviation prevention behavior generation target yaw rate. Thereafter, in step S4, referring to a determination result of the timing of the switchover, in a case where it is not the timing of the switchover of the deviation prevention behavior generation target yaw rate, the routine may proceed to step S5. In step S5, the first deviation prevention behavior generation target yaw rate $\gamma tgt\_turn\_1$ for the return-to-inside-lane control may be calculated. Meanwhile, in step S4, in a case where it is the timing of the switchover of the deviation prevention behavior generation target yaw rate, the routine may proceed to step S6. In step S6, the second deviation prevention behavior generation target yaw rate $\gamma tgt\_turn\_2$ for the posture control may be calculated.

Thereafter, the routine may proceed to step S7. In step S7, the target yaw rate $\gamma tgt$ may be calculated. During the return-to-inside-lane control, the target yaw rate γtgt may be the addition of the lane curvature turn target yaw rate γtgt_lane in accordance with the lane curvature and the first deviation prevention behavior generation target yaw rate γtgt_turn_1. During the posture control, the target yaw rate γtgt may be the addition of the lane curvature turn target yaw rate γtgt_lane and the second deviation prevention behavior generation target yaw rate γtgt_turn_2.

Thereafter, the routine may proceed from step S7 to step S8. In step S8, the target steering torque Tp may be calculated. The target steering torque Tp may be the addition of the feedforward torque Tp_ff_lane and Tp_ff_turn, and the feedback torque Tp_fb. The feedforward torque Tp_ff_lane and Tp_ff_turn may be obtained by torque conversion of the lane curvature turn target yaw rate γtgt_lane and the deviation prevention behavior generation target yaw rate γtgt_turn. The feedback torque Tp_fb is to be fed back to the target yaw rate γtgt. However, in a case with detection of the driver's steering operation in the direction in which the deviation is suppressed, the feedback torque Tp_fb may be brought to zero (0).

After the calculation of the target steering torque Tp, the routine may proceed to step S9. In step S9, output processing may be performed. The output processing may include outputting the target steering torque Tp to the motor driver 20 that drives the EPS motor 12. By the output processing, the predetermined steering control through the EPS device 1 may be carried out.

Description is given next of the deviation prevention behavior generation target yaw rate switchover determination routine to be executed in step S3 of the forgoing main routine, with reference to the flowchart of FIG. 6.

In the deviation prevention behavior generation target yaw rate switchover determination routine, first, in step S11, a check may be made as to whether or not the own vehicle has already passed the first target point, and whether or not the own vehicle is under the posture control, with the return-to-inside-lane control having been ended. In a case where the own vehicle has already been under the posture control, the routine may be terminated. In a case where the own vehicle has not been under the posture control yet, the routine may proceed to step S12.

In step S12, the first target point arrival time Ttgt may be calculated. The first target point arrival time Ttgt is the time it takes for the own vehicle to arrive at the first target point. Thereafter, the routine may proceed to step S13. In step S13, a check may be made as to whether or not the first target point arrival time Ttgt is equal to or smaller than a preset threshold Tset. In a case where the first target point arrival time Ttgt is larger than the threshold Tset (Ttgt>Tset), the routine may proceed from step S13 to step S15. In step S15, a determination may be made that the switchover from the first deviation prevention behavior generation target yaw rate γtgt_turn_1 to the second deviation prevention behavior generation target yaw rate γtgt_turn_2 is not to be permitted (NG).

Meanwhile, in step S13, in a case where the first target point arrival time Ttgt is equal to or smaller than the threshold Tset (Ttgt≤Tset), the routine may proceed from step S13 to step S14. In step S14, a check may be made as to whether or not the state of Ttgt≤Tset has continued for predetermined time set in advance or longer. In a case where the state of Ttgt≤Tset has not continued for the predetermined time, the routine may proceed from step S14 to step S15. In step S15, a determination may be made that the switchover of the deviation prevention behavior generation target yaw rate is not to be permitted (NG).

Thereafter, in a case where the state of Ttgt≤Tset has continued for the predetermined time or longer, the routine may proceed from step S14 to step S16. In step S16, a determination may be made that the switchover of the deviation prevention behavior generation target yaw rate is to be permitted (OK). By the determination of the permission of the switchover, in the lane deviation prevention control, the switchover may be made from the first deviation prevention behavior generation target yaw rate γtgt_turn_1 for the return-to-inside-lane control to the second deviation prevention behavior generation target yaw rate γtgt_turn_2 for the posture control.

As described, in this implementation, in the execution of the lane deviation prevention control, the first target point arrival time Ttgt is estimated on the basis of the lane curvature κ and on the basis of the relative-to-lane yaw angle estimated value θ of the own vehicle. The first target point arrival time Ttgt thus estimated may be compared with the threshold Tset, to determine the timing of the switchover from the first deviation prevention behavior generation target yaw rate γtgt_turn_1 to the second deviation prevention behavior generation target yaw rate γtgt_turn_2. In this way, in the lane deviation prevention control of this implementation, it is possible to prevent the yaw angle of the own vehicle at the end of the control from being larger than the targeted yaw angle, regardless of the delay in the vehicle response and/or the delay in the detection of the lane information. Hence, it is possible to end the control, with the own vehicle taking the posture with the appropriate yaw angle with respect to the opposite lane to the direction in which the deviation prevention has been carried out. This leads to prevention of behavior in the deviation-inducing direction. Hence, it is possible to optimize the vehicle posture at the end of the control.

The steering controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering controller 50 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering controller 50 illustrated in FIG. 1.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane deviation prevention control device for vehicle, the lane deviation prevention control device comprising:
    a first target amount of turn calculator configured to calculate, on a basis of time it takes for an own vehicle to deviate from a lane on which the own vehicle is traveling, and on a basis of a yaw angle of the own vehicle, a first target amount of turn from a start of a lane deviation prevention control to an arrival at a first target point, the lane deviation prevention control including preventing the own vehicle from deviating from the lane;
    a second target amount of turn calculator configured to calculate, on a basis of time it takes to travel from the first target point to a second target point, and on the basis of the yaw angle of the own vehicle, a second target amount of turn that decides a posture of the own vehicle from the first target point to the second target point, the second target point serving as an end point of the lane deviation prevention control; and
    a target amount of turn switchover determiner configured to obtains, on the basis of the yaw angle of the own vehicle, a yaw angle estimated value of the own vehicle until the arrival at the first target point, estimates, on a basis of a curvature of the lane and on the basis of the yaw angle estimated value of the own vehicle, arrival time from the start of the lane deviation prevention control to the arrival at the first target point, and compares the estimated arrival time with a threshold, to determine timing of a switchover from the first target amount of turn to the second target amount of turn.

2. The lane deviation prevention control device for vehicle according to claim 1, wherein the target amount of turn switchover determiner obtains the yaw angle estimated value by correcting the yaw angle in accordance with output delay time of the yaw angle.

3. The lane deviation prevention control device for vehicle according to claim 1, wherein the target amount of turn switchover determiner obtains the yaw angle estimated value by correcting the yaw angle in accordance with yaw response time of the own vehicle.

4. The lane deviation prevention control device for vehicle according to claim 1, wherein the target amount of turn switchover determiner obtains the yaw angle estimated value by correcting the yaw angle in accordance with total time of output delay time of the yaw angle and yaw response time of the own vehicle.

5. A lane deviation prevention control device for vehicle, the lane deviation prevention control device comprising circuitry configured to
    calculate, on a basis of time it takes for an own vehicle to deviate from a lane on which the own vehicle is traveling, and on a basis of a yaw angle of the own vehicle, a first target amount of turn from a start of a lane deviation prevention control to an arrival at a first target point, the lane deviation prevention control including preventing the own vehicle from deviating from the lane;
    calculate, on a basis of time it takes to travel from the first target point to a second target point, and on the basis of the yaw angle of the own vehicle, a second target amount of turn that decides a posture of the own vehicle from the first target point to the second target point, the second target point serving as an end point of the lane deviation prevention control; and
    obtain, on the basis of the yaw angle of the own vehicle, a yaw angle estimated value of the own vehicle until the arrival at the first target point, estimates, on a basis of a curvature of the lane and on the basis of the yaw angle estimated value of the own vehicle, arrival time from the start of the lane deviation prevention control to the arrival at the first target point, and compares the estimated arrival time with a threshold, to determine timing of a switchover from the first target amount of turn to the second target amount of turn.

* * * * *